United States Patent [19]

Nolte

[11] Patent Number: 4,681,503

[45] Date of Patent: Jul. 21, 1987

[54] METHOD AND DEVICE FOR UNLOADING BULK MATERIAL FROM A LARGE CONTAINER

[75] Inventor: Günther Nolte, Moers, Fed. Rep. of Germany

[73] Assignee: Conrad Scholtz AG, Hamburg, Fed. Rep. of Germany

[21] Appl. No.: 774,599

[22] PCT Filed: Dec. 18, 1984

[86] PCT No.: PCT/EP84/00409

§ 371 Date: Aug. 28, 1985

§ 102(e) Date: Aug. 28, 1985

[87] PCT Pub. No.: WO85/03279

PCT Pub. Date: Aug. 1, 1985

[30] Foreign Application Priority Data

Jan. 26, 1984 [DE] Fed. Rep. of Germany ....... 3402649

[51] Int. Cl.⁴ ............................................. B65G 63/00
[52] U.S. Cl. .................................... 414/144; 198/509; 198/511; 414/139; 414/140
[58] Field of Search ............... 414/133, 144, 145, 140, 414/139, 138, 137, 527, 528, 572, 390, 209, 353, 313, 786; 198/509, 511

[56] References Cited

U.S. PATENT DOCUMENTS

| | | | |
|---|---|---|---|
| 1,398,195 | 11/1921 | Liggett | 198/509 X |
| 3,144,142 | 8/1964 | Wallace, Jr. | 414/145 |
| 3,247,951 | 4/1966 | Cochran | 198/509 |
| 3,349,892 | 10/1967 | Barre | 198/509 |
| 3,583,582 | 6/1971 | Ostarello | 414/139 |
| 4,264,003 | 4/1981 | Gill | 198/509 |
| 4,440,537 | 4/1984 | Blättermann et al. | 414/139 |

FOREIGN PATENT DOCUMENTS

| | | | |
|---|---|---|---|
| 1805526 | 2/1970 | Fed. Rep. of Germany | 198/509 |
| 2342322 | 4/1975 | Fed. Rep. of Germany | 414/139 |
| 2716014 | 1/1978 | Fed. Rep. of Germany | 414/139 |
| 2932113 | 2/1981 | Fed. Rep. of Germany | 414/144 |
| 0009644 | 1/1982 | Japan | 414/144 |
| 2081203 | 2/1982 | United Kingdom | 414/139 |

*Primary Examiner*—Frank E. Werner
*Attorney, Agent, or Firm*—Bell, Seltzer, Park & Gibson

[57] ABSTRACT

An endless conveyor belt 10 provided with angled-over entraining cleats 12 as well as lateral corrugated sidewalls 11 serves the purpose of unloading bulk material 1 from a ship 2 in particular, which not only carries the bulk material 1 out of the ship 2 but also picks the same up automatically. The conveyor belt 10 hangs down with both legs 10' and 10" from an upper driving drum 20 within a conveyor framework 3 and runs freely below the conveyor framework 3 in a loop 21 formed merely under the action of the weight of the conveyor belt without application of external tensioning devices. The conveyor framework 3 is lowered so far into the bulk material 1 that the loop 21 shortens in vertical direction and the conveyor belt 10 digs into and picks up the bulk material 1 with the entraining cleats 12. A vertically displaceable delimiting drum 27 in the loop 21 prevents an excessive lateral displacement of the loop 21 as a reaction to the scooping action.

10 Claims, 3 Drawing Figures

METHOD AND DEVICE FOR UNLOADING BULK MATERIAL FROM A LARGE CONTAINER

DESCRIPTION

The invention relates to a method and a device for unloading of bulk material from a large container, in particular from a ship of the type utilizing an endless circulating conveyor belt with transversely aligned entraining cleats.

In the case of known methods and devices of this kind, e.g. as apparent from the DE-OS No. 31 02 731, a special implement for reception of the bulk material, for example a bucket wheel, is provided in the region of the bottom terminal deflection of the conveyor belt or rather at the lower extremity of the conveyor framework, which is dipped into the bulk material and transfers the bulk material received to the conveyor belt circulating in conventional manner between two extreme drums, under initial tension. The reception implement and the transfer system needed for the purpose, represent a great structural complexity.

The invention is based on the task of specifying a method according to the nature defined, and a corresponding device for the unloading of bulk material with which it is possible to secure an appreciable reduction of the structural complexity of the unloading device.

In accordance with the invention, this problem is resolved by the following method and device.

The conveyor belt itself acts as a reception implement in the method according to the invention and the corresponding device. The conveyor belt, or rather the conveyor framework comprising the conveyor belt, are lowered so far that the conveyor belt is dipped into the bulk material in the area of the free loop and picks up the same with its scoop-like entraining bars or cleats angled over in the direction of displacement, to convey the said material upwards out of the container in the conveying section or leg, without another transfer. A great structural simplification is accomplished thanks to the omission of a special reception means and of a corresponding transfer system, which is the greater, since it does not have to be secured at the cost of particular complexity regarding the guiding of the conveyor belt in the area of its bottom terminal deflection. On the contrary, the conveyor belt extends thereat in extremely uncomplicated manner in a freely formed loop. It was discovered in surprising manner that allowing the conveyor belt to run in this unconfined loop and thus necessarily also without particular pretensioning, does not in any way deleteriously affect the operational behaviour of the conveyor belt, in particular its rectilinear running. Care should merely be applied to ensure that the driving drum enflanked by the conveyor belt is positioned at such adequate height for the same that the intrinsic weight of the conveyor belt below the driving drum results in a sufficiently great frictional interlock on the driving drum for driving the conveyor belt. Apart from the great structural simplification, allowing the conveyor belt to run in the free loop also has considerable advantages for the operation upon reception of the bulk material: the conveyor belt can work itself into the bulk material without external constraint and under practically automatic adaptation to the slop of said material. Possible obstacles within the bulk material, e.g. lumps of particularly great weight or container components projecting into the same, may be avoided automatically by the conveyor belt. A particularly great protection for the self-scooping conveyor belt, but also of the bulk material itself, is assured thereby. The propensity of the belt to "mould" itself to the bottom moreover results in a particularly neat clearing of the container down to the bottom on which the conveyor belt practically sweeps up the bulk material with its entraining cleats, that is to say also in areas in which the bottom is curved or uneven. The consequence is a totality of the clearing of the container even in recesses and distant corners not accomplished with existing reception means.

The conveyor belt will preferably be lowered or allowed to dip into the bulk material and the loop is so deformed by the counterthrust of the bulk material that, in the region of the loop, the return leg assumes the outline of an actually absent horizontal beam. In this case, the conveyor belt runs approximately linearly over a longer span at the bottom extremity of the loop, its angled-over entraining cleats digging progressively deeper into the bulk material in the direction of travel. This establishes a particularly high degree of conveyor belt loading with bulk material. Furthermore, the conveyor belt runs particularly smoothly and vibration-free in this loop lay-out.

As a reaction to the scooping action of the conveyor belt digging itself into the bulk material, a displacement of the loop occurs against the direction of displacement of the conveyor belt, which may assume an undesirably great proportion in the case of heavy or highly sticky bulk material. To limit this displacement, a delimiting drum is incorporated within the loop in accordance with an important further development of the invention. This delimiting drum has no effect on the forming of the loop and, in particular, does not impart any initial tensioning stress to the conveyor belt. It merely serves the purpose of stabilizing the loop during operation and to assure that the conveyor belt, as seen in the direction of travel, is not lifted prematurely out of the bulk material and "runs away" in upward direction. The delimiting drum is preferably so positioned that the conveying leg of the conveyor belt has an approximately rectilinear extension away from the delimiting drum. The delimiting drum may be displaced to a limited extent in the vertical direction, so that it may always adapt itself to the momentary condition variably assumed by the loop during the receiving operation. A preferred and structural especially uncomplicated suspension of the delimiting drum on the conveyor framework in such manner that the actions described are the result and that no rigid preset form of the loop shape occurs, is provided.

The conveyor belt utilized is preferably occupied by so-called corrugated sidewalls and the entraining cleats should then be say 20% higher than the corrugated sidewalls for example, so that the corrugated sidewalls do not obstruct the scooping operation. Together with the angled over entraining cleats, the corrugated sidewalls form separate conveying boxes on the carrying side of the conveyor belt in a manner known per se, in which the bulk material may also be conveyed in vertical upward direction without utilization of a complementary outer covering. Furthermore, the lateral corrugated sidewalls would contribute to an increase of the degree of loading of the conveyor belt upon receiving the bulk material, inasmuch as they assure that once bulk material has been picked up by the angled-over entraining cleats, it cannot flow away again laterally. If the conveyor belt lacks corrugated sidewalls, a stationary covering will be provided for the conveying leg, within which the entraining cleats are displaced and which thereby prevents the bulk material dropping off the entraining cleats.

In the simplest lay-out of the device according to the invention, one driving drum only is present at the top extremity of the conveyor framework, from which the conveyor belt is suspended in a manner of speaking, the bottom portion of the conveyor belt representing the loop. The conveyor framework may have a considerable height in practice. It is appropriate in this case that the conveyor belt be guided complementarily in the conveyor framework, at least at the bottom extremity of the conveyor framework. Possible intrinsic motions of the conveyor belt generated by the scooping operation are thereby limited to the area of the loop, and both conveyor belt sections or legs have a defined path within the conveyor framework so that unwanted contacts between the conveyor belt and the conveyor framework are prevented. As already stated, the driving drum need not be situated right at the top extremity of the conveyor framework. On the contrary, the conveyor belt will regularly be guided into a horizontal or lightly sloping conveying path via a deflector device at the upper extremity of the conveyor framework, either to establish an appropriate dumping possibility for the bulk material, or to carry the same onward in lateral direction along a long distance by means of the same conveyor belt. The driving drum is then situated at the extremity of the horizontal branch of the conveying path.

To facilitate the working-in of the entraining cleats of the conveyor belt into the bulk material, the entraining cleats may have a sharply tapering top edge. At least some of the entraining cleats may be provided with tines for loosening the bulk material. In the case of this embodiment, the advantage that the container is "swept" clean down to the floor by means of the rubber entraining cleats, is renounced however.

The invention is described in particular in the following, with other advantageous features, in respect of two diagrammatically illustrated examples of embodiment. In the drawings.

Figure 1:
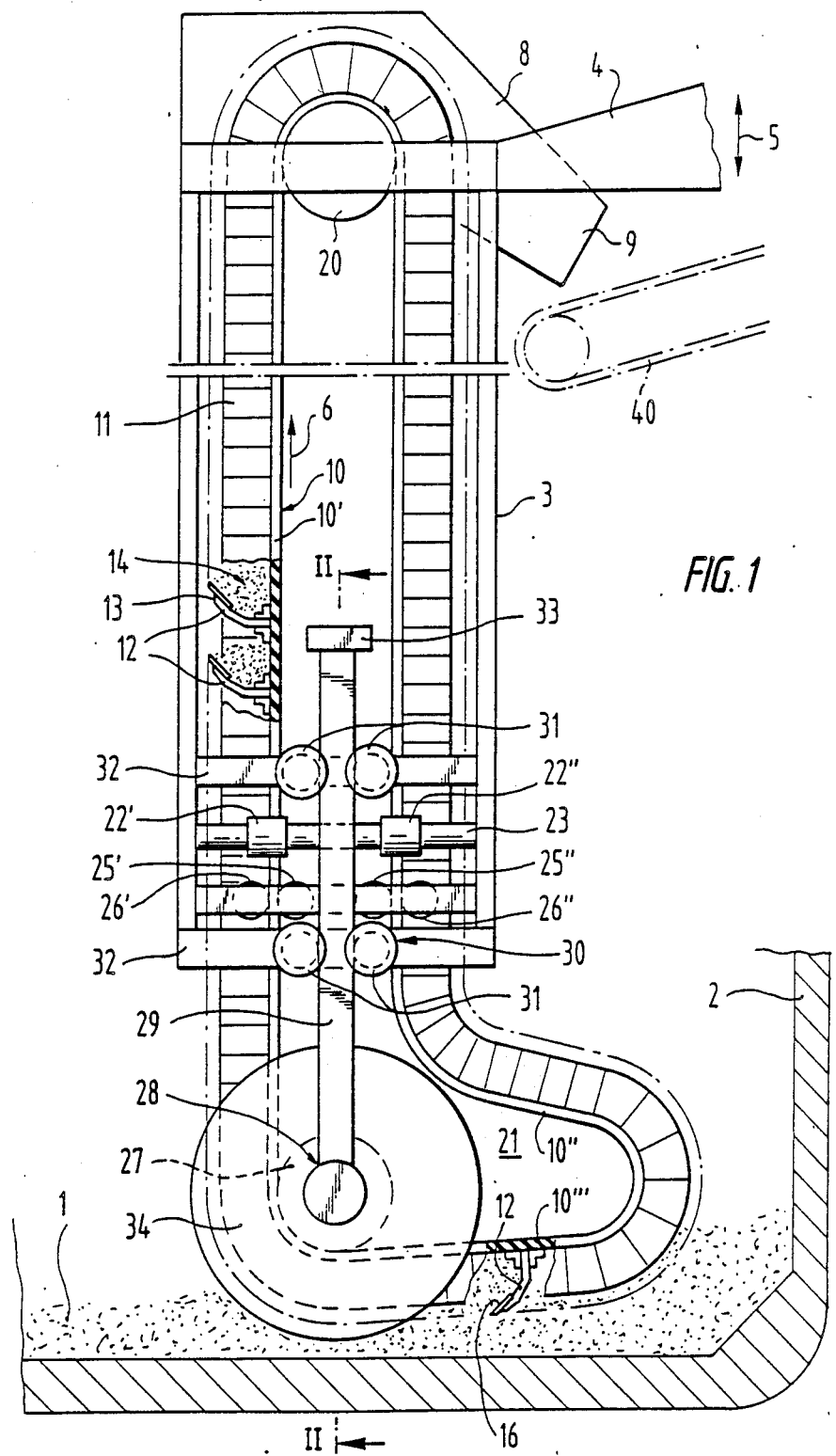
FIG. 1 shows a device for unloading bulk material from a ship in a schematized partially cut-away side-view.
Figure 2:
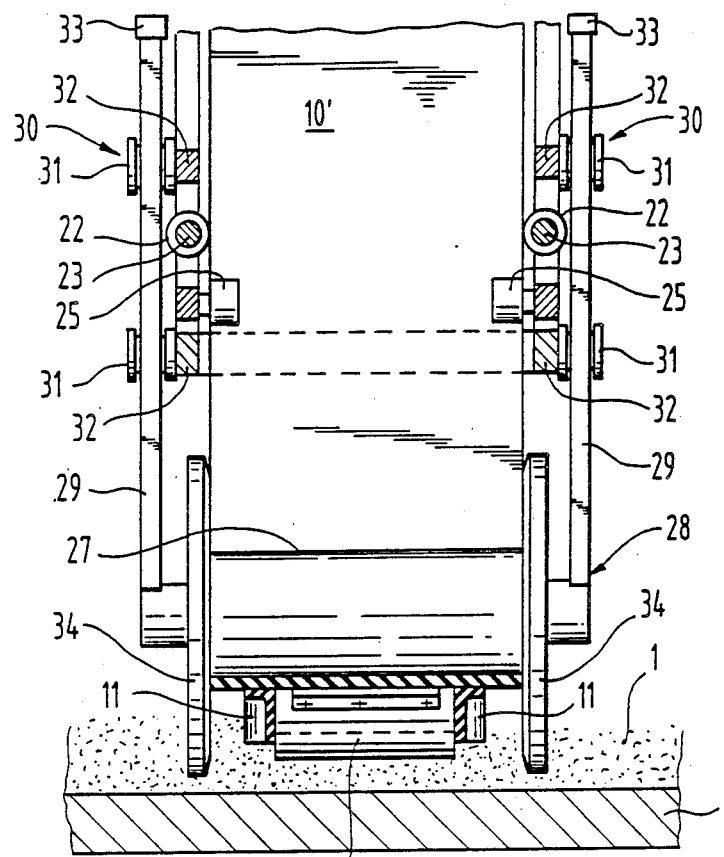
FIG. 2 shows a cross-section along the line II—II of FIG. 1.

The device according to FIGS. 1 and 2 serves the purpose of unloading bulk material 1 from a ship 2. The device comprises a vertical conveyor framework 3 which is suspended via a lateral carrying jib 4 at the upper extremity in a manner which is not illustrated in particular but is known per se from a shoreside crane installation. The conveyor framework 3 may be lifted and lowered steplessly in vertical direction by means of the crane installation in the manner indicated by the double-headed arrow 5. Furthermore, the conveyor framework may be displaced in horizontal direction in the manner normal in the case of ship discharging devices, so that all points of the inside of the ship may be reached during unloading.

An endless conveyor belt 10 of rubber, which is provided on its carrying side with two lateral, corrugated and uninterrupted marginal flanges, being so-called corrugated sidewalls 11 which are equally produced of rubber. The corrugated sidewalls 11 are in each case situated at a distance from the adjacent longitudinal edge of the conveyor belt 7, in such manner that two free marginal portions of the conveyor belt projecting beyond the corrugated sidewalls 11, are present. Furthermore, the conveyor belt is occupied on the carrying side and between the corrugated sidewalls with entraining cleats 12 of rubber which are aligned transversely between said sidewalls and uniformly spaced apart in the longitudinal direction of the conveyor belt. Together with the entraining cleats 12, the corrugated sidewalls 11 border, on the conveyor belt, separate continuously consecutive conveying boxes 14 for reception of the bulk material 1. The entraining cleats 12 have an angled-over shovel-like cross-section, the slope pointing in the direction of displacement of the conveyor belt 10 denoted by the arrow 6. Measured at right angles to the plane of the conveyor belt, the entraining cleats 12 are say 20% higher than the corrugated sidewalls 11. The top edges 13 of the entraining cleats are produced in acutely tapering form. Several tines 16 of metal arranged distributed across the width, which project beyond the top edge 13 by a distance away from the conveyor belt 10, may be fastened on each entraining cleat.

The endless conveyor belt 10 runs, with the carrying side towards the outside, over a driving drum 20 which is installed at the top extremity of the conveyor framework 3. The two legs of the conveyor belt 10 at either side of the driving drum 20, namely the conveying leg 10' running upwards towards the driving drum 20, and the return leg 10" running downwards off the driving drum 20, are freely suspended from the driving drum, i.e. merely under the load of their intrinsic weight. Both legs 10' and 10" extend throughout the length of the conveyor framework and downwards beyond its lower extremity, so that the second bottom end deflection of the conveyor belt 10 occurs beneath the conveyor framework 3. The conveyor belt 10 then runs freely below the conveyor framework 3 in a loop 21 formed under the action of the intrinsic weight of the conveyor belt, without application of external tensioning means. Each leg 10'-and 10" has allocated to it guiding rollers situated at the bottom extremity of the conveyor framework 3, which hold the two legs above the loop 21 in a particular plane and in a particular lateral alignment, in each case. In particular, a total of four guiding rollers 22' and 22" acting on the edges of the two legs is provided, which are mounted on two spindles 23 extending in horizontal direction transversely to the conveyor belt plane and to this have a position such that the conveyor belt legs are held laterally by the guiding rollers 22 in alignment on the driving drum 20. Other guiding rollers 25 and 26 having axes of rotation parallel to the axis of rotation of the driving drum 20 are installed on two struts 24 of the conveyor framework 3 which are parallel to the spindles 23. The guiding rollers 25 extend over the width of the conveyor belt and bear against its running side. The guiding rollers 26 are constructed as stub rollers and are situated opposite to the guiding rollers at the carrying side, that is to say in the area of the narrow marginal portions of the conveyor belt outside the corrugated sidewalls 11. The guiding rollers 25 and 26 are so arranged that the two legs 10' and 10" run precisely parallel to the conveyor framework 3 above the guiding rollers, up to the driving drum 20.

A loose delimiting drum 27 bearing under its weight against the running side of the conveyor belt 10 is situated within the loop 21. The delimiting drum 27 is installed on the bottom end of an arm 28 which has two branch arms 29 displaceably held on the conveyor framework 3 in the direction of the path of the conveyor belt legs 10' and 10", which extend upwards out of the loop 21 at either side of the conveyor belt 10. To this end, roller guides 30 for the branch arms 29 are provided externally on the conveyor framework at either side of the conveyor belt 10, see also FIG. 2. Each roller guide 30 comprises two pairs of flanged rollers 31 positioned one above another with mutual spacing, whereof the flanged rollers are rotatably journalled axially parallel to the guiding rollers 25 and 26 on struts 32 of the conveyor framework. By means of the branch arms 29 borne between the pairs 30 of flanged rollers, the delimiting drum 27 is held in a plane parallel to the conveyor belt legs 10' and 10", in which it may nevertheless be freely displaced upwards and downwards, to which end stop elements 33 at the top extremity of the branch arms prevent sliding downwards out of the guides 30. The lateral position of the delimiting drum is so selected that the conveyor leg 10' runs upwards from the delimiting drum 27 on a path which is the rectilinear extension of the path of the conveyor leg within the conveyor framework 3.

The delimiting drum 27 has two lateral flanges 34 whereof the radius is greater than the sum of the radius of the drum 27 and the height of the conveyor belt, the latter being measured from the actual conveyor belt 10, at right angles up to the top edge 13 of the entraining cleats 12. Consequently, the flanges 34 stand proud above the entraining cleats 12 in radial direction as well as over the corrugated sidewalls 11 of the conveyor drum circulating over the drum, to a small extent. The flanges 34 have two functions: they cause complementary guiding of the conveyor belt in lateral direction. Furthermore, they act as spacers in the downward direction whilst the conveyor belt loop 21 approaches the bottom of the ship as the offloading of the same progresses. The flanges thus prevent damage to the conveyor belt by violent striking of the ship's bottom.

The flanges 34 may have teeth on the circumference, which is not shown in particular, which play a part in loosening the bulk material 1 which is to be picked up.

In the unused condition of the device, when the conveyor framework 3 is not lowered into a ship, the loop 21 hangs downwards freely with the two conveyor belt legs 10' and 10" parallel to each other. Measured from its lowest point and up to the guiding rollers 25, 26, it then has a height which corresponds approximately to nine times the height of the entraining cleats 12.

To discharge bulk material 1 from a ship 2, the conveyor framework 3 is gradually lowered into the ship whilst the conveyor belt 10 is running, until the conveyor belt 10 begins to dip into the bulk material 1 at the lower extremity of the loop 21. The lowering operation is continued until the loop 21 is deformed under the back pressure of the bulk material and assumes the form illustrated in the figure, in which it is shortened in vertical direction and in exchange is enlarged in horizontal direction in the area of the return leg 10" of the conveyor belt running back to the loop. A section 10''' is formed at the same time at the lower extremity of the loop, in which the conveyor belt extends approximately rectilinearly. The radii of the initially concave and then convex deflection of the return leg 10" preceding the rectilinear section 10''' are adjusted automatically because of the inherent rigidity of the conveyor belt 10 and of the corrugated sidewalls 11 superimposed thereon. The delimiting drum 27 is situated at the transition from the rectilinear section 10''' to the upwardly running conveyor leg 10'. The conveyor belt 10 digs itself into the bulk material 1 to an increasing depth by means of its entraining cleats 12 in the rectilinear section 10''' which has a small downward slope in the running direction of the conveyor belt, until the conveying boxes 14 are filled completely with bulk material and run upwards on the conveying leg 10' in the filled state. The delimiting drum 27 prevents a shift of the loop 21 opposed to the running direction 6 of the conveyor belt in the rectilinear section 10''' which would otherwise arise as a reaction to the scooping action. The delimiting drum 27 does not however preset any rigid form for the loop 21, but may adapt itself without impediment to the changes in shape of the loop which occur mandatorily upon receiving the bulk material because of its installation on the displaceable arms 28. The conveyor framework 3 is gradually lowered farther in the degree in which the ship 2 is emptied of bulk material by the action of the conveyor belt, so that the operational form of the loop 21 as described is retained approximately at all times.

A cover 8 merely sketched in the drawing, with which is in communication a lateral hopper 9 through which the upwardly carried bulk material 10 is transferred to a merely sketched belt conveyor 40 travelling on to shore, is provided in the area of the top end deflection of the conveyor belt 10 at the driving drum 20.

Figure 3:
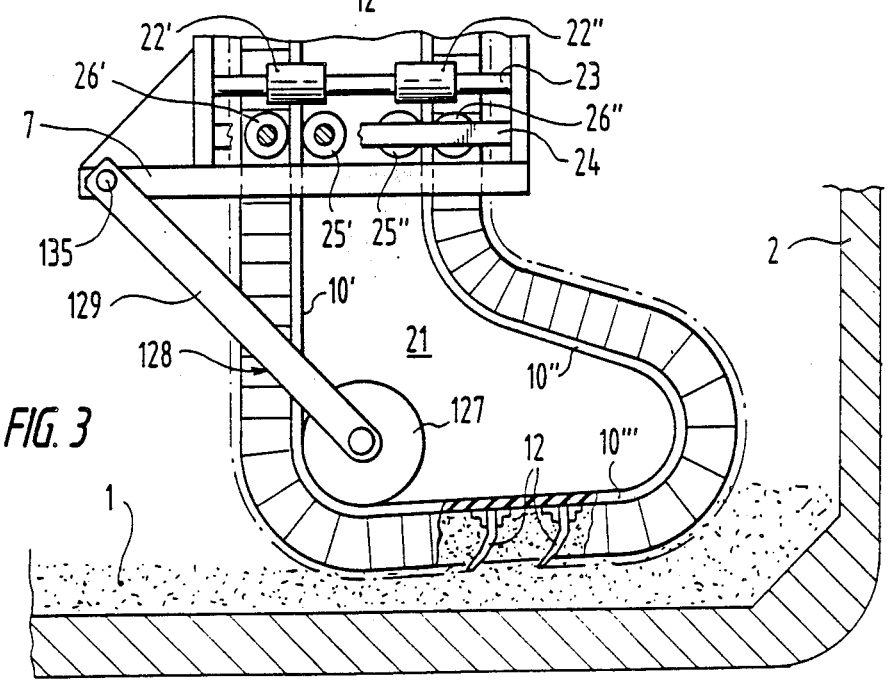
FIG. 3 shows the lower part of another device modified as compared to FIG. 1, for unloading bulk material in a view corresponding to FIG. 1.

FIG. 3 shows a modified form of the device described in the foregoing, which corresponds identically in its upper part which is not illustrated, as well as with the parts which bear the same reference numbers as in FIGS. 1 and 2. The modification consists in a different construction and guiding of the delimiting drum within the loop 21.

In the modified form, a delimiting drum 127 is provided without lateral flanges. It becomes possible thereby to place the conveyor belt in contact with the ship's bottom and thus to accomplish a quite complete neat emptying of the ship if use is made moreover of a conveyor belt lacking tines on the entraining cleats 12.

The delimiting drum 127 is moreover mounted on an arm 128 which has its two branch arms 129 pivotally coupled to the conveyor framework 3 about a horizontal spindle 135, in the modified form. The pivot spindle 135 parallel to the conveyor belt legs is installed on the extremity of a short beam 7 which at the lower extremity of the conveyor framework 3 projects away from the same laterally in extension of the lower struts 32. The delimiting drum 127 is displaceable to a limited degree in vertical direction on the arm 128, a finite displacement simultaneously also occurring in horizontal direction. The design is so arranged that the delimiting drum 127 has a lateral position in the operating position illustrated, in which the branch arms 129 extend downwards under an angle of 30° to 45°, in such manner that the conveying leg 10' runs upwards rectilinearly from the delimiting drum 127.

As for the rest, the mode of operation is the same as in the preceding example of embodiment.

I claim:
1. A conveying device for unloading bulk material from a large container, particularly a ship, comprising:

an elongate framework adapted to be attached to a crane mechanism to extend therefrom and define a generally vertically-extending portion for being progressively lowered by the crane mechanism into the container as the bulk material is unloaded therefrom;

a flexible conveyor belt comprising rubber-like material and having inner and outer sides of predetermined width and defining conveying and returning legs and including a plurality of flexible transversely-aligned entraining cleat means comprising rubber-like material and mounted on said outer side and spaced-apart from each other in the longitudinal direction of said conveyor belt and having an angled scoop-like cross-section for defining with said conveyor belt conveying compartments for conveying the bulk material, said endless conveyor belt having an effective length longer than said framework and being positioned within said framework along the length thereof to extend outwardly therefrom at its lower extremity in a free loop formed by the intrinsic weight of said conveyor belt without external tensioning and supporting means;

a driving roll for receiving said inner side of said conveyor belt therearound and driving said conveyor belt in the direction of the angled scoop-like cross-section of said cleat means while allowing the lower extremity of said conveyor belt below said framework to travel freely in the loop formed by its intrinsic weight;

guide means carried by the lower extremity of said framework for receiving said conveying and returning legs of said conveyor belt and for guiding and maintaining said legs in a desired plane and lateral alignment, each of the guide means being located on either side of a plane defining a center of said vertically-extending portion of said framework; and delimiting drum means carried by said framework for generally vertical movement under its own weight and engaging said inner side of the lower extremity of said conveyor belt forming the loop for maintaining said conveying leg of said conveyor belt as it starts its upward path of travel in a path of travel defining generally a rectilinear extension of the path of travel of said conveying leg within said frame-work the drum means being located within the plane defining the center of said vertically-extending portion of said framework;

whereby, the loop of said conveyor belt below said framework is deformed and shortened from said delimiting drum means back to said returning leg to form a rectilinear portion at the bottom of the loop under the back pressure of the bulk material during the unloading operation to enhance such unloading operation.

2. A conveying device, as set forth in claim 1, in which said conveyor belt further includes spaced-apart corrugated walls mounted on said conveyor belt and extending generally outwardly from said outer side generally along and inwardly of the longitudinal outer edges of said conveyor belt and on each side of said transversely-aligned entraining cleat means for defining with said cleat means and said conveyor belt the conveying compartments for conveying bulk material.

3. A conveying device, as set forth in claim 2, in which said entraining cleat means extend outwardly from said outer side of said conveyor belt a distance greater than said corrugated side walls.

4. A conveying device, as set forth in claims 1, 2 or 3, in which said entraining cleat means have an arcuately tapering top edge.

5. A conveying device, as set forth in claim 1, 2 or 3, in which at least some of said entraining cleat means include tines mounted on and projecting outwardly therefrom and away from said conveyor belt for the loosening of the bulk material being unloaded.

6. A conveying device, as set forth in claim 1, or 2, in which said guide means comprise pairs of guiding rollers mounted on said framework for receiving between respective pairs the longitudinal edge portions of said conveying and returning legs of said conveyor belt.

7. A conveying device, as set forth in claim 1, in which the loop of said conveyor belt extending outwardly from said framework at its lower extremity in the undeformed condition thereof has a length measured from its lowest point and up to the lower extremity of said framework which corresponds to six to twelve times the length of said entraining cleat means extending outwardly from said conveyor belt.

8. A conveying device, as set forth in claim 1, in which the loop of said conveyor belt extending outwardly from said framework at its lower extremity in the undeformed condition thereof has a length measured from its lowest point and up to the lower extremity of said framework which corresponds to eight to ten times the length of said entraining cleat means extending outwardly from said conveyor belt.

9. A conveying device, as set forth in claim 1, in which said delimiting drum means includes arm means carrying said drum means and extending upwardly therefrom and guide means mounted on said framework for receiving said arm means for upward and downward movement therein to allow said drum means to move upwardly and downwardly in a generally vertical direction.

10. A conveying device, as set forth in claim 1 or 9, in which said delimiting drum means includes side flanges mounted thereon and having a radius greater than the sum of the radius of said delimiting drum and the combined thickness of said conveyor belt and the length of said entraining cleat means.

* * * * *